No. 774,763. PATENTED NOV. 15, 1904.
W. H. LEVEY.
KITCHEN UTENSIL.
APPLICATION FILED AUG. 15, 1904.
NO MODEL.

Witnesses:
H. Schreiber
E. Behel

Inventor:
Wilbur H. Levey
By A. O. Behel
Attys.

No. 774,763. Patented November 15, 1904.

UNITED STATES PATENT OFFICE.

WILBER H. LEVEY, OF WOODSTOCK, ILLINOIS

KITCHEN UTENSIL.

SPECIFICATION forming part of Letters Patent No. 774,763, dated November 15, 1904.

Application filed August 15, 1904. Serial No. 220,878. (No model.)

*To all whom it may concern:*

Be it known that I, WILBER H. LEVEY, a citizen of the United States, residing at Woodstock, in the county of McHenry and State of Illinois, have invented certain new and useful Improvements in Kitchen Utensils, of which the following is a specification.

The object of this invention is to construct an auxiliary pan to be supported by a dish-pan and to receive the washed dishes.

Figure 1:
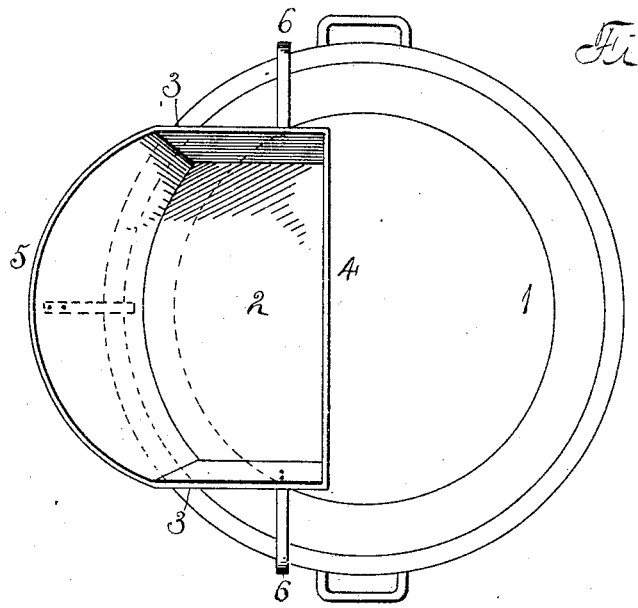
Figure 2:
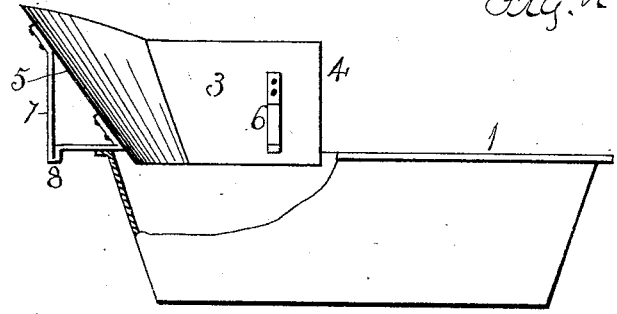
Figure 3:
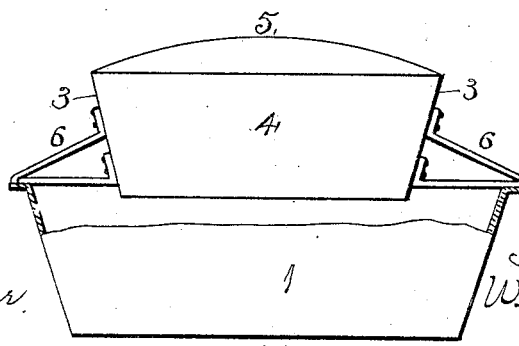

In the accompanying drawings, Figure 1 is a plan view of a dish-pan with my improved auxiliary pan supported thereby. Fig. 2 is a side elevation. Fig. 3 is an inner end elevation.

The dish-pan 1 is of the ordinary construction.

The auxiliary pan comprises the bottom 2, sides 3, and ends 4 and 5. The end 5 extends beyond the bottom at the top, thereby forming an enlarged open end. To the sides 3 are secured supports 6, and to the end 5 is secured a support 7, having a depending outer end 8. The supports 6 are elevated some distance from the bottom of the auxiliary pan, and the depending end 8 is on the same plane as the bottom of the pan.

In use the auxiliary pan is located over the dish-pan and is held in position by the supports. By elevating the supports 6 the lower portion of the auxiliary pan is located within the dish-pan in order that all drippings from the auxiliary pan may fall within the dish-pan.

By locating the depending end 8 of the support 7 on the same plane as the bottom of the auxiliary pan an additional support is formed for the pan when it is placed on the table, without which the pan would upset, owing to the overhanging end 5.

I claim as my invention—

An auxiliary pan for a dish-pan having two supports located above the bottom of auxiliary pan, and a third support having its free end on a level with the bottom of the auxiliary pan.

WILBER H. LEVEY.

Witnesses:
LYMAN J. LEVEY,
ETTA M. LEVEY.